United States Patent
Park et al.

(10) Patent No.: US 9,473,012 B2
(45) Date of Patent: Oct. 18, 2016

(54) APPARATUS AND METHOD FOR CONTROLLING LOW VOLTAGE DC/DC CONVERTER BY USING INPUT CURRENT INFORMATION ON LOW VOLTAGE DC/DC CONVERTER

(71) Applicant: LSIS CO., LTD., Anyang-si, Gyeonggi-do (KR)

(72) Inventors: Chul Woo Park, Seoul (KR); Woo Sup Kim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 100 days.

(21) Appl. No.: 14/338,142

(22) Filed: Jul. 22, 2014

(65) Prior Publication Data

US 2015/0171725 A1    Jun. 18, 2015

(30) Foreign Application Priority Data

Dec. 18, 2013 (KR) .................. 10-2013-0158758

(51) Int. Cl.
  *H02M 1/08*     (2006.01)
  *H02M 3/335*    (2006.01)
  *H02M 1/00*     (2006.01)

(52) U.S. Cl.
  CPC ......... *H02M 1/08* (2013.01); *H02M 3/33507* (2013.01); *H02M 3/33523* (2013.01); *H02M 2001/0009* (2013.01)

(58) Field of Classification Search
  CPC ............. H02M 2001/0009; H02M 3/33507; H02M 3/33523; H02M 1/08
  See application file for complete search history.

(56) References Cited

U.S. PATENT DOCUMENTS

| | | | | |
|---|---|---|---|---|
| 6,885,851 B1* | 4/2005 | Miura | ............... | H03G 3/348 455/234.1 |
| 2004/0239487 A1* | 12/2004 | Hershbarger | ............. | H04L 5/14 375/258 |
| 2011/0240630 A1* | 10/2011 | Etorre | ................. | H05B 1/0236 219/482 |

(Continued)

FOREIGN PATENT DOCUMENTS

| | | |
|---|---|---|
| EP | 1835605 | 9/2007 |
| EP | 2333944 | 6/2011 |

(Continued)

OTHER PUBLICATIONS

European Patent Office Application Serial No. 14178135.1, Search Report dated Oct. 1, 2015, 6 pages.
Japan Patent Office Application Serial No. 2014-169223, Office Action dated Nov. 24, 2015, 3 pages.

*Primary Examiner* — Jue Zhang
*Assistant Examiner* — Lakaisha Jackson
(74) *Attorney, Agent, or Firm* — Lee, Hong, Degerman, Kang & Waimey PC; Jonathan Kang; Justin Lee

(57) ABSTRACT

A low voltage DC/DC converter (LDC) control apparatus for controlling an LDC including a transformer and a PWM controller is provided. The low voltage DC/DC converter (LDC) control apparatus includes an input current calculating unit calculating an input current of the LDC by using magnetization inductance information on the transformer and effective duty information on the PWM controller; an output current calculating unit calculating the instantaneous value and average value of an output current based on the input current calculated by the input current calculating unit; and an LDC control unit generating a control signal for over current protection (OCP) or power limit based on the instantaneous value and average value of the output current calculated by the output current calculating unit, wherein the LDC control unit outputs the generated control signal to the PWM controller.

16 Claims, 2 Drawing Sheets

(56) References Cited

U.S. PATENT DOCUMENTS

2013/0051084 A1* 2/2013 Hachiya ............ H02M 3/33507
363/21.01
2014/0176403 A1* 6/2014 Inoue ................... G09G 3/3208
345/77

FOREIGN PATENT DOCUMENTS

| JP | 2006-353048 | 12/2006 |
| JP | 2011-509068 | 3/2011 |
| JP | 2011-130562 | 6/2011 |
| JP | 2013-046438 | 3/2013 |

* cited by examiner

APPARATUS AND METHOD FOR CONTROLLING LOW VOLTAGE DC/DC CONVERTER BY USING INPUT CURRENT INFORMATION ON LOW VOLTAGE DC/DC CONVERTER

CROSS-REFERENCE TO RELATED APPLICATIONS

Pursuant to 35 U.S.C. §119(a), this application claims the benefit of earlier filing date and right of priority to Korean Patent Application No. 10-2013-0158758, filed on Dec. 18, 2013, the contents of which are all hereby incorporated by reference herein in its entirety.

BACKGROUND

The present disclosure relates to an apparatus and method for controlling a low voltage DC/DC converter (LDC) by using input current information on the LDC, and more particularly, to an apparatus and method for controlling the low voltage DC/DC converter (LDC) by using input current information on the LDC that may decrease an error from a topology using a transformer by using primary current information, namely, input current information on the transformer of an LDC in an electric vehicle, and use magnetization inductance information on the transformer and effective duty information on a PWM controller for controlling the LDC to enhance accuracy in controlling the LDC.

Vehicles use fossil fuel such as gasoline or diesel and have developed according to a fundamental principle in which thermal energy is converted into a physical force through an engine. However, they started finding other power sources for some reasons such as environmental problems and the exhaustion of fuel due to the usage of fossil fuel, and electric energy based vehicles such as hybrid electric vehicles (HEV), plug-in-electric vehicles (PHEV), electric vehicles (EV) have been developed.

In recent, research and development on electric components are being performed in order to produce products and preoccupy markets based on higher performance and efficiency beyond fundamental implementation.

Electric components and peripheral elements on which research and development are being mainly performed include an on board charger (OBC), a low voltage DC/DC converter (LDC), and a battery pack. Each part is a main component related directly to the power of an EV and is an element that directly affects the performance of the EV.

Among others, the LDC that receives an input voltage of 200 VDC to 450 VDC, converts the received voltage into a low voltage of 12 VDC, and supplies the low voltage to a battery and each part of the EV is one of the most important electric components in the EV.

Due to the characteristic of the LDC requiring a high voltage transformation ratio, a DC/DC converter topology (phase shifted pull-bridge) that uses a transformer is commonly used.

Typically, only a single variable, efficiency has been applied in representing the relation between an input voltage or current and an output voltage or current, and the assumption that the characteristics of physical elements configuring a circuit are all ideal has been used. When there is another variable, such an assumption may affect current control performance because errors in outputs increase. Also, such errors may limit the performance of the LDC in functions requiring current information having relatively high accuracy such as an output over current protection (OCP) function or a power limit (derating) function.

Regarding limitations due to the occurrence of errors, the LDC that shows low voltage-high current output characteristics has a limitation in that it is difficult to wind the secondary windings of a transformer several times in consideration of entire efficiency. This leads to a decrease in the magnetization inductance Lm of a transformer increasing in proportion to the number of primary windings and the transformer is no longer ideal.

Also, when a transfer ratio from an input voltage to an output voltage, effective duty Deff is not considered, actual current information has an error. When excluding the winding ratio n of a transformer, the duty representing the transfer ratio of the input/output voltage has various delay times in an actual configuration. Since the duty Deff considering a decrease in duty occurring on a transfer path appears, applying it to the process of drawing an output current is needed.

SUMMARY

Embodiments provide an apparatus and method for controlling a low voltage DC/DC converter (LDC) by using input current information on the LDC that may decrease an error from a topology using a transformer by using primary current information, namely, input current information on the transformer of an LDC in an electric vehicle, and use magnetization inductance information on the transformer and effective duty information on a PWM controller for controlling the LDC to enhance accuracy in controlling the LDC.

The technical tasks of the present invention are not limited to the above-mentioned technical tasks and other technical tasks not mentioned will be able to be clearly understood by a person skilled in the art from the following descriptions.

In one embodiment, a low voltage DC/DC converter (LDC) control apparatus for controlling an LDC including a transformer and a PWM controller includes an input current calculating unit calculating an input current of the LDC by using magnetization inductance information on the transformer and effective duty information on the PWM controller; an output current calculating unit calculating the instantaneous value and average value of an output current based on the input current calculated by the input current calculating unit; and an LDC control unit generating a control signal for over current protection (OCP) or power limit based on the instantaneous value and average value of the output current calculated by the output current calculating unit, wherein the LDC control unit outputs the generated control signal to the PWM controller.

The low voltage DC/DC converter (LDC) control apparatus may further include a memory that stores the inductance L of the transformer, the magnetization inductance Lm of the transformer, the duty D of the PWM controller, the duty error d of the PWM controller, the section efficiency eff of the LDC, the number n of primary windings of the transformer, and the number m of secondary windings of the transformer.

The input current calculating unit may use the inductance L of the transformer, the magnetization inductance Lm of the transformer, the duty D of the PWM controller, the duty error d of the PWM controller, the section efficiency eff of the LDC, the number n of primary windings of the transformer, and the number m of secondary windings of the transformer that are read from the memory; the input voltage of the LDC measured at the input of the LDC 20; and the output voltage of the LDC measured at the output of the LDC to calculate the input current of the LDC.

The input current calculating unit may compensate for the slope of the magnetization inductance information Lm of the transformer and compensate for effective duty at which the input current is transferred from the PWM controller to the output to calculate the input current of the LDC.

The input current calculating unit may calculate the input current of the LDC according to the following equations:

$$Ig = S_n \times Ts$$
$$S_n = \frac{(n \cdot Vg - Vo) \cdot (D - d)}{L} \cdot \frac{1}{n} \cdot \frac{1}{m} \cdot eff + \frac{Vg \cdot (D - d)}{L_M} \cdot \frac{1}{m}$$

(where Ig: input current of LDC, Sn: sloep of input current waveform, Vg: input voltage of LDC, Vo: output voltage of LDC, D: duty of PWM controller, d: duty error of PWM controller, Lm: magnetization inductance of transformer, L: inductance of transformer, eff: section efficiency of LDC, n: number of primary windings of transformer, m: number of secondary windings of transformer, and Ts: period).

The LDC control unit may regularly update the section efficiency eff of the LDC on the memory.

The input current calculating unit, the output current calculating unit, and the LDC control unit may use input current information on an LDC implemented in a digital signal processing (DSP) chip.

The input current calculating unit, the output current calculating unit, and the LDC control unit may be implemented in the LDC.

The input current calculating unit, the output current calculating unit, and the LDC control unit may be implemented in a programmable logic device (PLD).

In another embodiment, a low voltage DC/DC converter (LDC) control method for controlling an LDC including a transformer and a PWM controller includes calculating, by an input current calculating unit, the input current of the LDC by using magnetization inductance information on the transformer and effective duty information on the PWM controller; calculating, by an output current calculating unit, the instantaneous value and average value of an output current based on the input current calculated; and generating, by an LDC control unit, a control signal for OCP or power limit based on the instantaneous value and average value of the output current calculated, and outputting the generated control signal to the PWM controller.

The low voltage DC/DC converter (LDC) control method may further include storing, by a memory, the inductance L of the transformer, the magnetization inductance Lm of the transformer, the duty D of the PWM controller, the duty error d of the PWM controller, the section efficiency eff of the LDC, the number n of primary windings of the transformer, and the number m of secondary windings of the transformer.

The calculating of the input current of the LDC may include using the inductance L of the transformer, the magnetization inductance Lm of the transformer, the duty D of the PWM controller, the duty error d of the PWM controller, the section efficiency eff of the LDC, the number n of primary windings of the transformer, and the number m of secondary windings of the transformer that are read from the memory; the input voltage of the LDC measured at the input of the LDC; and the output voltage of the LDC measured at the output of the LDC to calculate the input current of the LDC.

The calculating of the input current of the LDC may include compensating for the slope of the magnetization inductance information Lm of the transformer and compensating for effective duty at which the input current is transferred from the PWM controller to the output to calculate the input current of the LDC.

The calculating of the input current of the LDC may include calculating the input current of the LDC according to the following equations:

$$Ig = S_n \times Ts$$
$$S_n = \frac{(n \cdot Vg - Vo) \cdot (D - d)}{L} \cdot \frac{1}{n} \cdot \frac{1}{m} \cdot eff + \frac{Vg \cdot (D - d)}{L_M} \cdot \frac{1}{m}$$

(where Ig: input current of LDC, Sn: sloep of input current waveform, Vg: input voltage of LDC, Vo: output voltage of LDC, D: duty of PWM controller, d: duty error of PWM controller, Lm: magnetization inductance of transformer, L: inductance of transformer, eff: section efficiency of LDC, n: number of primary windings of transformer, m: number of secondary windings of transformer, and Ts: period).

The generating of the control signal and the outputting the generated signal to the PWM controller may include regularly updating the section efficiency eff of the LDC on the memory.

The calculating of the input current, the calculating of the output current, and the generating and outputting of the control signal may be performed in a DSP chip.

The calculating of the input current, the calculating of the output current, and the generating and outputting of the control signal may be performed in the LDC.

The calculating of the input current, the calculating of the output current, and the generating and outputting of the control signal may be performed in a PLD.

DETAILED DESCRIPTION OF THE EMBODIMENTS

Exemplary embodiments of the present invention are described below in detail with reference to the accompanying drawings. However, it may not be said that the spirit of the present invention is limited to presented embodiments, and it is possible to easily propose, by the addition, change or deletion of components, other retrogressive inventions or other embodiments included in the spirit of the present invention.

The terms used herein are general terms currently, widely used if possible, but in particular cases, terms arbitrarily selected by the applicant are used and in these cases, since their meanings are described in detail in corresponding parts of the detailed description, it should be noted that the present invention needs to be understood with the meanings of the terms, not the names of the terms.

That is, in the following description, the word "including" does not exclude the presence of components or steps other than those enumerated.

Figure 1:
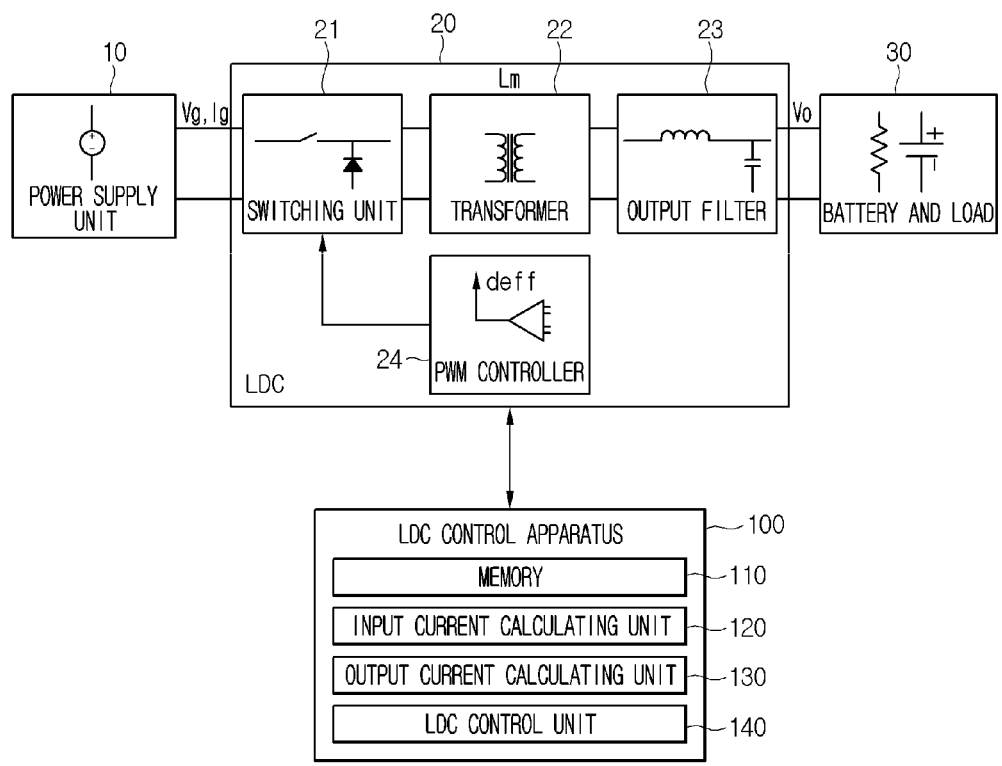
FIG. 1 is a block diagram of an LDC control apparatus according to an embodiment.

FIG. 1 is a block diagram of a low voltage DC/DC converter (LDC) control apparatus according to an embodiment.

Referring to FIG. 1, an LDC control apparatus 100 is electrically connected to a power supply unit 10, an LDC 20, a battery and load unit 30.

The LDC control apparatus 100 performs LDC control by using the instantaneous values of the voltage and current information on the LDC 20 based on a switching frequency.

The LDC 20 includes a switching unit 21, a transformer 22, an output filter 23, and a PWM controller 24.

The switching unit 21 switches a current supplied from the power supply unit and transfers the switched current to the transformer 22. The transformer 22 performs voltage transformation on power supplied through the switching unit 21. For example, the transformer 22 receives an input voltage of 200 VDC to 450 VDC, transforms the received voltage into a low voltage of 12 VDC, and outputs the low voltage to the battery and load unit 30. The output filter 23 filters out noise from the output voltage obtained through the transformation and outputs noise-removed voltage. The PWM controller 24 outputs a switching control signal to the switching unit 21 according to the control signal of the LDC control apparatus 100 and performs correction on the input current and voltage.

The LDC control apparatus 100 may reflect magnetization inductance information on the transformer 22 and effective duty information on the PWM controller 24, calculate input current information on the LDC 20 and perform LDC control.

Figure 2:
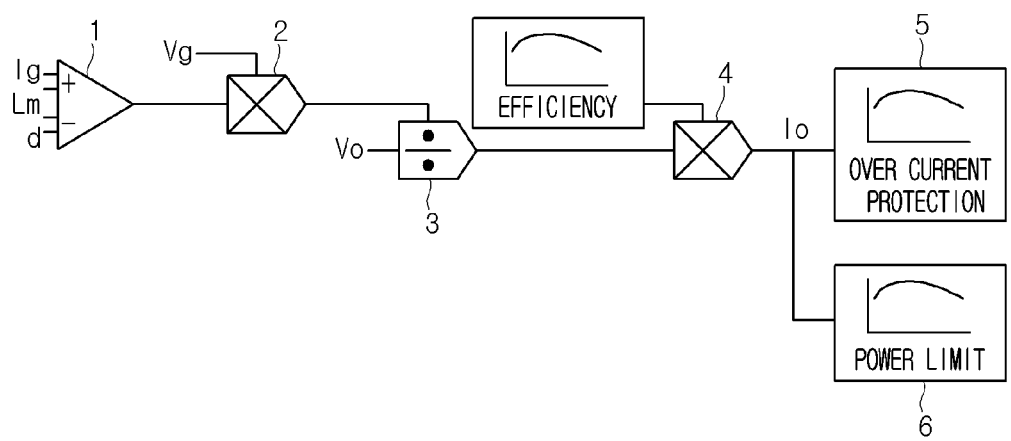
FIG. 2 is a conceptual view of an LDC control method by an LDC control apparatus according to an embodiment.

FIG. 2 is a conceptual view of an LDC control method by an LDC control apparatus 100 according to an embodiment.

Referring to FIG. 2, the input current Ig of the LDC 20, the magnetization inductance Lm of the transformer 22 and the duty error d of the PWM controller are added by an adder 1. In this case, the magnetization inductance Lm of the transformer 22 and the duty error d of the PWM controller may be + components or − components with respect to the input current Ig component of the LDC 20, but this example describes when they are − components. The input voltage Vg of the LDC is multiplied by the output value of the adder 1 by using a multiplier 2. The output value of the multiplier 2 is divided by the output voltage Vo of the LDC 20 by using a divider 3. The output of the divider 3 is multiplied by the section efficiency eff of the LDC by using the multiplier 4 and the output current Io of the LDC is output. The output current Io of the LDC 20 may be used for an over current protection (OCP) function 5 or a power limit function 6.

The LDC control apparatus 100 includes a memory 110, an input current calculating unit 120, an output current calculating unit 130, and an LDC control unit 140.

The LDC control apparatus 100 may be implemented in a digital signal processing (DSP) chip. The LDC control apparatus 100 may be implemented in the LDC 20. The LDC control apparatus 100 may be implemented in a programmable logic device (PLD).

The memory 110 stores the inductance L of the transformer, the magnetization inductance Lm of the transformer, the duty D of the PWM controller, the duty error d of the PWM controller, the section efficiency eff of the LDC, the number n of primary windings of the transformer, and the number m of secondary windings of the transformer.

The input current calculating unit 120 uses the magnetization inductance information Lm of the transformer and the effective duty D-d of the PWM controller to calculate the input current Ig of the LDC 20.

The input current calculating unit 120 may use the inductance L of the transformer, the magnetization inductance Lm of the transformer, the duty D of the PWM controller, the duty error d of the PWM controller, the section efficiency eff of the LDC, the number n of primary windings of the transformer, and the number m of secondary windings of the transformer that are read from the memory 110; the input voltage Vg measured at the input of the LDC 20; and the output voltage Vo measured at the output of the LDC 20 to calculate the input current Ig of the LDC 20.

The input current calculating unit 120 may compensate for the slope of the magnetization inductance information Lm of the transformer 120 and compensate for effective duty at which the input current is transferred from the PWM controller to the output to calculate the input current Ig of the LDC 140.

The output current calculating unit 130 calculates the instantaneous value or average value of the output current based on the input current value calculated by the input current calculating unit 110.

The LDC control unit 140 generates a control signal for OCP or power limit by the instantaneous value or average value of the output current calculated by the output current calculating unit 120 and outputs the generated signal to the PWM controller 24.

The input current calculating unit 120 calculates the input current of the LDC 20.

Input power Pin of the LDC 20 may be expressed as Equation 1 and the output current of the LDC 20 may be expressed as Equation 2.

$$P_{in} = V_g \times I_g \quad \langle \text{Equation 1} \rangle$$

$$I_g = P_{in} \times \frac{1}{V_o} \times \frac{1}{\textit{eff}} \quad \langle \text{Equation 2} \rangle$$

Input current information on the LDC to which peak current mode control is applied based on the input current from the power supply unit 10 may be expressed by the multiplication of the slope Sn and period Ts of a current waveform as Equation 3 below, based on an instantaneous value.

$$Ig = S_n \times Ts \quad \langle \text{Equation 3} \rangle$$

The input current calculating unit 120 applies several variables to Equation 3 above in order to compensate for an error in current information on the LDC 20.

The slope Sn in Equation 3 may be represented as Equation 4 below when a duty change of the PWM controller 24 and the magnetization inductance of the transformer 22 are not considered.

$$S_n = \frac{(n \cdot Vg - Vo) \cdot (D - d)}{L} \cdot \frac{1}{n} \cdot \frac{1}{m} \times \textit{eff} \quad \langle \text{Equation 4} \rangle$$

The input current calculating unit 120 reflects current information due to the magnetization inductance Lm of the transformer 22 as an additional component based on Equation 2.

Thus, Equation 4 may be represented as Equation 5. As could be seen in Equation 5, the additional component due to the magnetization inductance is not affected by the efficiency of the LDC 20.

$$S_n = \frac{(n \cdot Vg - Vo)D}{L} \cdot \frac{1}{n} \cdot \frac{1}{m} \times \mathit{eff} + \frac{V_g D}{L_M} \cdot \frac{1}{m} \quad \langle\text{Equation 5}\rangle$$

When Equation 5 includes a component due to the duty error d of the PWN controller 24, Equation 6 below may be finally drawn. In this example, the duty error d represents a duty error occurring at the PWM controller 24.

$$S_n = \frac{(n \cdot Vg - Vo) \cdot (D - d)}{L} \cdot \frac{1}{n} \cdot \frac{1}{m} \times \mathit{eff} + \frac{V_g \cdot (D - d)}{L_M} \cdot \frac{1}{m} \quad \langle\text{Equation 6}\rangle$$

Since the slope Sn and the duty of the PWM controller 24 are adjusted by current information due to the magnetization inductance Lm of the transformer 22 and the duty error d component of the PWM controller 24, the input current calculating unit 120 obtains an input current value that approaches a more accurate value.

The output current calculating unit 130 may calculate the instantaneous value and average value of an output current based on more accurate input current information calculated by the input current calculating unit 110. Thus, the output current calculating unit 130 may obtain an accurate value which has a smaller error.

The LDC control unit 140 generates a control signal for OCP or power limit by the instantaneous current value or average current value calculated by the output current calculating unit 120 and outputs the generated signal to the PWM controller 24. Thus, since the LDC control unit 140 may actually reflect the current and voltage states of the LDC 20, it is possible to increase the accuracy of when to operate a current limit function and a protection circuit by using output current information sensed at the output of the LDC 20.

The effect of increasing the accuracy of output current information obtained by the present invention may be achieved by using magnetization inductance information obtained from the transformer 22 and effective duty information obtained from the PWM controller 24 in the LDC control process.

The magnetization inductance value Lm obtained from the transformer 22 is information previously learning in a design step. The error d determining effective duty obtained from the PWM controller 24 is the sum of values considered when designing sensing network components on a current sensing circuit.

The LDC control unit 140 may use peak current mode control by the instantaneous current value calculated by the output current calculating unit 130 and use an output current to perform LDC control.

The LDC control unit 140 may regularly update the section efficiency eff of the LDC 20 on the memory 110.

Also, the LDC control unit 140 may use a charge current mode or an average current mode by the average current value calculated by the output current calculating unit 130 to perform LDC control.

Figure 3:
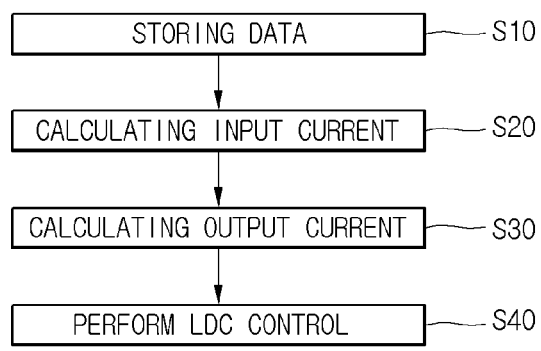
FIG. 3 is a flow chart of an LDC control method by an LDC control apparatus according to an embodiment.

FIG. 3 is a flow chart of an LDC control method by an LDC control apparatus according to an embodiment.

Referring to FIG. 3, the LDC control method by the LDC control apparatus according to an embodiment may include storing data in step S10, calculating an input current in step S20, calculating an output current in step S30, and performing LDC control in step S40.

The storing of the data in step S10 may be performed by the memory 110. In the storing of the data in step S10, the inductance L of the transformer, the magnetization inductance Lm of the transformer, the duty D of the PWM controller, the duty error d of the PWM controller, the section efficiency eff of the LDC, the number n of primary windings of the transformer, and the number m of secondary windings of the transformer are stored in the memory 110.

The calculating of the input current in step S20 may be performed by the input current calculating unit 120. Step S20 where the input current is calculated uses magnetization inductance information on the transformer 22 and effective duty information on the PWM controller 24 to calculate the input current of the LDC.

Step S20 where the input current is calculated may use the inductance L of the transformer, the magnetization inductance Lm of the transformer 22, the duty D of the PWM controller 24, the duty error d of the PWM controller, the section efficiency eff of the LDC 20, the number n of primary windings of the transformer, and the number m of secondary windings of the transformer that are read from the memory 110; the input voltage Vg measured at the input of the LDC 20; and the output voltage Vo measured at the output of the LDC 20 to calculate the input current of the LDC.

Step S20 where the input current is calculated may compensate for the slope of the magnetization inductance information Lm of the transformer 22 and compensate for effective duty at which the input current is transferred from the PWM controller 24 to an output to calculate the input current of the LDC 20.

Step S20 where the input current is calculated may calculate the input current of the LDC 20 according to the following equations:

$$Ig = S_n \times Ts$$

$$S_n = \frac{(n \cdot Vg - Vo) \cdot (D - d)}{L} \cdot \frac{1}{n} \cdot \frac{1}{m} \times \mathit{eff} + \frac{Vg \cdot (D - d)}{L_M} \cdot \frac{1}{m}$$

(where Ig: input current of LDC, Sn: sloep of input current waveform, Vg: input voltage of LDC, Vo: output voltage of LDC, D: duty of PWM controller, d: duty error of PWM controller, Lm: magnetization inductance of transformer, L: inductance of transformer, eff: section efficiency of LDC, n: number of primary windings of transformer, m: number of secondary windings of transformer, and Ts: period)

Step S30 where the output current is calculated may be performed by the output current calculating unit 130. Step S30 where the output current is calculated calculates the instantaneous value and average value of the output current based on the input current calculated by step S20 where the input current is calculated.

Step S40 where LDC is controlled may be performed by the LDC control unit 140. Step S40 where the LDC is controlled generates a control signal for OCP or power limit based on the instantaneous value and average value of the output current calculated by step S30 where the output current is calculated, and outputs the generated signal to the PWM controller.

Step S40 where the LDC is controlled may regularly update the section efficiency eff of the LDC on the memory 110.

The calculating of the input current, the calculating of the output current, and the generating and outputting of the control signal may be performed by a DSP chip.

The calculating of the input current, the calculating of the output current, and the generating and outputting of the control signal may be performed by the LDC 20.

The calculating of the input current, the calculating of the output current, and the generating and outputting of the control signal may be performed by a PLD.

According to the present invention, by using primary current information, namely, input current information on the transformer of the LDC, it is possible to decrease an error from a topology using a transformer, and by using magnetization inductance information on the transformer and effective duty information on a PWM controller for controlling the LDC, it is possible to provide an effect of increasing accuracy in controlling the LDC.

While particular embodiments have been described in the detailed description of the present invention, several variations may be made without departing from the scope of the present invention. Therefore, the scope of the present invention should not be limited to the above-described embodiments but be defined by the following claims and equivalents thereof.

What is claimed is:

1. A low voltage DC/DC converter (LDC) control apparatus for controlling an LDC including a transformer and a PWM controller, the low voltage DC/DC converter (LDC) control apparatus comprising:
an input current calculating unit configured to calculate an input current of the LDC by using magnetization inductance information on the transformer and effective duty information on the PWM controller;
an output current calculating unit configured to calculate the instantaneous value and average value of an output current based on the input current calculated by the input current calculating unit; and
an LDC control unit configured to generate a control signal for over current protection (OCP) or power limit based on the instantaneous value and average value of the output current calculated by the output current calculating unit, wherein the LDC control unit is further configured to output the generated control signal to the PWM controller,
wherein the input current calculating unit is further configured to use the inductance L of the transformer, the magnetization inductance Lm of the transformer, the duty D of the PWM controller, the duty error d of the PWM controller, the section efficiency of the LDC, the number n of primary windings of the transformer and the number m of secondary windings of the transformer that are read from the memory, the input voltage of the LDC measured at the input of the LDC, and the output voltage of the LDC measured at the output of the LDC to calculate the input current of the LDC.

2. The low voltage DC/DC converter (LDC) control apparatus according to claim 1, further comprising a memory configured to store the inductance L of the transformer, the magnetization inductance Lm of the transformer, the duty D of the PWM controller, the duty error d of the PWM controller, the section efficiency of the LDC, the number n of primary windings of the transformer, and the number m of secondary windings of the transformer.

3. The low voltage DC/DC converter (LDC) control apparatus according to claim 2, wherein the LDC control unit is further configured to regularly update the section efficiency of the LDC on the memory.

4. The low voltage DC/DC converter (LDC) control apparatus according to claim 1, wherein the input current calculating unit is further configured to compensate for the slope of the magnetization inductance information Lm of the transformer and compensate for effective duty at which the input current is transferred from the PWM controller to the output to calculate the input current of the LDC.

5. The low voltage DC/DC converter (LDC) control apparatus according to claim 4, wherein the input current calculating unit is further configured to calculate the input current of the LDC according to the following equations:

$$Ig = S_n \times Ts$$
$$S_n = \frac{(n \cdot Vg - Vo) \cdot (D-d)}{L} \cdot \frac{1}{n} \cdot \frac{1}{m} \times \mathit{eff} + \frac{Vg \cdot (D-d)}{L_M} \cdot \frac{1}{m}$$

where Ig: input current of LDC, Sn: slope of input current waveform, Vg: input voltage of LDC, Vo: output voltage of LDC, D: duty of PWM controller, d: duty error of PWM controller, Lm: magnetization inductance of transformer, L: inductance of transformer, eff: section efficiency of LDC, n: number of primary windings of transformer, m: number of secondary windings of transformer, and Ts: period.

6. The low voltage DC/DC converter (LDC) control apparatus according to claim 1, wherein the input current calculating unit, the output current calculating unit, and the LDC control unit are implemented in a programmable logic device (PLD).

7. The low voltage DC/DC converter (LDC) control apparatus according to claim 1, wherein the input current calculating unit, the output current calculating unit, and the LDC control unit are implemented in a digital signal processing (DSP) chip.

8. The low voltage DC/DC converter (LDC) control apparatus according to claim 1, wherein the input current calculating unit, the output current calculating unit, and the LDC control unit are implemented in the LDC.

9. A low voltage DC/DC converter (LDC) control method for controlling an LDC including a transformer and a PWM controller, the control method comprising:
calculating, by an input current calculating unit, the input current of the LDC by using magnetization inductance information on the transformer and effective duty information on the PWM controller;
calculating, by an output current calculating unit, the instantaneous value and average value of an output current based on the calculated input current; and
generating, by an LDC control unit, a control signal for OCP or power limit based on the instantaneous value and average value of the calculated output current and outputting the generated control signal to the PWM controller,
wherein the calculating of the input current of the LDC comprises using the inductance L of the transformer, the magnetization inductance Lm of the transformer, the duty D of the PWM controller, the duty error d of the PWM controller, the section efficiency of the LDC, the number n of primary windings of the transformer, and the number m of secondary windings of the transformer that are read from the memory, the input voltage of the LDC measured at the input of the LDC, and the output voltage of the LDC measured at the output of the LDC to calculate the input current of the LDC.

10. The low voltage DC/DC converter (LDC) control method according to claim 9, further comprising storing, by a memory, the inductance L of the transformer, the magnetization inductance Lm of the transformer, the duty D of the PWM controller, the duty error d of the PWM controller, the section efficiency of the LDC, the number n of primary windings of the transformer, and the number m of secondary windings of the transformer.

11. The low voltage DC/DC converter (LDC) control method according to claim 10, wherein the generating of the control signal and the outputting the generated signal to the PWM controller comprise regularly updating the section efficiency of the LDC on the memory.

12. The low voltage DC/DC converter (LDC) control method according to claim 9, wherein the calculating of the input current of the LDC comprises compensating for the slope of the magnetization inductance information Lm of the transformer and compensating for effective duty at which the input current is transferred from the PWM controller to the output to calculate the input current of the LDC.

13. The low voltage DC/DC converter (LDC) control method according to claim 12, wherein the calculating of the input current of the LDC comprises calculating the input current of the LDC according to the following equations:

$$Ig = S_n \times Ts$$

$$S_n = \frac{(n \cdot Vg - Vo) \cdot (D - d)}{L} \cdot \frac{1}{n} \cdot \frac{1}{m} \times \mathit{eff} + \frac{Vg \cdot (D - d)}{L_M} \cdot \frac{1}{m}$$

where Ig: input current of LDC, Sn: slope of input current waveform, Vg: input voltage of LDC, Vo: output voltage of LDC, D: duty of PWM controller, d: duty error of PWM controller, Lm: magnetization inductance of transformer, L: inductance of transformer, eff: section efficiency of LDC, n: number of primary windings of transformer, m: number of secondary windings of transformer, and Ts: period.

14. The low voltage DC/DC converter (LDC) control method according to claim 9, wherein the calculating of the input current, the calculating of the output current, and the generating and outputting of the control signal are performed in a DSP chip.

15. The low voltage DC/DC converter (LDC) control method according to claim 9, wherein the calculating of the input current, the calculating of the output current, and the generating and outputting of the control signal are performed in the LDC.

16. The low voltage DC/DC converter (LDC) control method according to claim 9, wherein the calculating of the input current, the calculating of the output current, and the generating and outputting of the control signal are performed in a PLD.

* * * * *